(12) United States Patent
Miller et al.

(10) Patent No.: US 12,340,688 B2
(45) Date of Patent: Jun. 24, 2025

(54) SPEED ENFORCEMENT DATA COLLECTION AND MAPPING

(71) Applicant: Applied Concepts, Inc., Richardson, TX (US)

(72) Inventors: John Miller, Lewisville, TX (US); Stanley A. Walker, Flower Mound, TX (US); Steven F. Hocker, Gardner, KS (US); Sanford Damasco, McKinney, TX (US); Russell D. Kautz, The Colony, TX (US)

(73) Assignee: APPLIED CONCEPTS, INC., Richardson, TX (US)

( * ) Notice: Subject to any disclaimer, the term of this patent is extended or adjusted under 35 U.S.C. 154(b) by 0 days.

(21) Appl. No.: 18/787,186

(22) Filed: Jul. 29, 2024

(65) Prior Publication Data
US 2025/0037576 A1    Jan. 30, 2025

Related U.S. Application Data

(60) Provisional application No. 63/529,559, filed on Jul. 28, 2023.

(51) Int. Cl.
*G08G 1/01* (2006.01)
*G01S 13/92* (2006.01)
*G08G 1/052* (2006.01)
*H04W 4/029* (2018.01)

(52) U.S. Cl.
CPC .............. *G08G 1/052* (2013.01); *G01S 13/92* (2013.01); *H04W 4/029* (2018.02)

(58) Field of Classification Search
CPC ........ G08G 1/052; G01S 13/92; H04W 4/029
USPC .......................................................... 340/936
See application file for complete search history.

(56) References Cited

U.S. PATENT DOCUMENTS

| | | | | |
|---|---|---|---|---|
| 5,515,042 A * | 5/1996 | Nelson | ................... | G08G 1/054 340/936 |
| 2015/0219758 A1* | 8/2015 | Gammenthaler | ..... | G01S 13/867 342/107 |
| 2016/0025500 A1* | 1/2016 | Hoffberg | ............... | H04W 4/024 701/423 |
| 2022/0234634 A1* | 7/2022 | Beach | ................... | B61L 25/026 |
| 2023/0296726 A1* | 9/2023 | Kautz | ................... | G01S 7/4091 342/70 |

* cited by examiner

*Primary Examiner* — Tai T Nguyen
(74) *Attorney, Agent, or Firm* — Jackson Walker LLP; Christopher J. Rourk

(57) ABSTRACT

A system for processing vehicle speed data is disclosed that includes a plurality of speed data systems operating on one or more electronic devices, each speed data system configured to detect vehicle speeds, to generate vehicle speed data for each vehicle and to transmit the vehicle speed data to a central data processing system. The central data processing system operating on one or more electronic devices and configured to receive the vehicle speed data, to transmit user interface control data to a remote device, and to process the vehicle speed data as a function of user-entered data from the remote device to generate a display that incorporates the processed speed data.

18 Claims, 2 Drawing Sheets

SPEED ENFORCEMENT DATA COLLECTION AND MAPPING

RELATED APPLICATIONS

The present application is a non-provisional application of U.S. Provisional Patent Application No. 63/529,559 filed Jul. 28, 2023, which is hereby incorporated by reference for all purposes as if set forth herein in its entirety.

TECHNICAL FIELD

The present disclosure relates generally to radar speed detectors, and more specifically to a system and algorithms for speed enforcement data collection and mapping.

BACKGROUND OF THE INVENTION

Radar speed detection is used by law enforcement to identify speed violations, but generates vehicle speed data that is generally discarded if the vehicle is not speeding.

SUMMARY OF THE INVENTION

A system for processing vehicle speed data is disclosed that includes a plurality of speed data systems operating on one or more electronic devices, each speed data system configured to detect vehicle speeds, to generate vehicle speed data for each vehicle and to transmit the vehicle speed data to a central data processing system. The central data processing system operating on one or more electronic devices and configured to receive the vehicle speed data, to transmit user interface control data to a remote device, and to process the vehicle speed data as a function of user-entered data from the remote device to generate a display that incorporates the processed speed data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
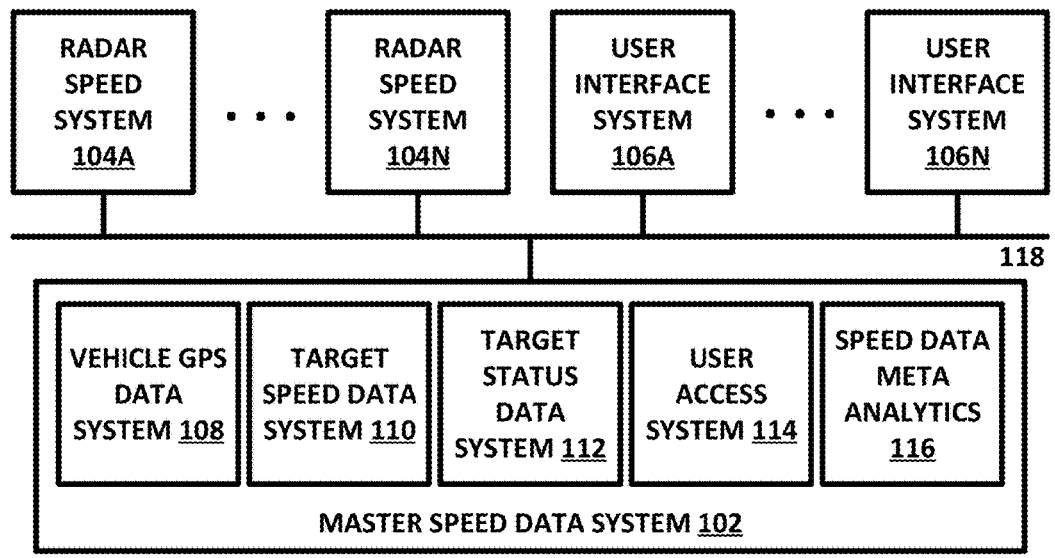
FIG. 1 is a diagram of a system for speed enforcement data collection and mapping, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure is directed to systems and algorithms for providing law enforcement organizations with the ability to visualize traffic patterns and to use map-based data to better deploy their speed enforcement resources. The present disclosure could also be used by governmental agencies such as the Department of Transportation to analyze traffic flow and mitigate congestion areas.

The present disclosure uses the speed enforcement radar in police vehicles to collect data on vehicle speeds. The collected data can include the speed of all vehicles, the speed of vehicles that were stopped for speeding and other suitable data. A speed detection radar system collects speed information on many vehicles that are in the detection zone to determine the speed of vehicles with the strongest reflected radar signals, the speed of the fastest vehicle and other vehicle speeds. However, the speed data on all other vehicles is normally discarded and only data for the strongest and/or fastest vehicle is presented to the officer for action.

The systems and algorithms of the present disclosure allow all vehicle speed data to be retained. This speed data can then be used to create a profile of the vehicle speeds on specific roads as a function of the time of day, number of detected vehicles, weather and so forth. The systems and algorithms of the present disclosure process the speed information in combination with the location of the police vehicle gathered from GPS or other suitable systems, the time of day and other suitable data and allows the data to be used to generate a map or other suitable user interfaces. Data can be transferred from the vehicle to a cloud-computing application, a hosted server or other suitable locations in real time, wirelessly via a 4G or 5G modem, by off-loading the data at the end of a shift using a Wi-Fi network, a USB thumb drive or other suitable data transfer mechanisms to transfer data from the speed detection radar to a suitable system.

The present disclosure enables the presentation of the data in a map centric display showing relative speeds based on location and time of day, the number of vehicles tracked (or vehicle density), and other suitable data. In addition, the present disclosure provides the ability to filter data, to see particular time periods, particular sources of data (which vehicle provided the data) or other relevant views of the data. The data presentation also includes provisions for seeing where traffic stops for speed violations were actually made. The present disclosure also includes adding other sources of traffic data such as fixed radar or video installations and merging that data with the data from the speed enforcement radar to create a single comprehensive view of traffic patterns.

FIG. 1 is a diagram of a system 100 for speed enforcement data collection and mapping, in accordance with an example embodiment of the present disclosure. System 100 includes master speed data system 102, which further includes vehicle GPS data system 108, target speed data system 110, target status data system 112, user access system 114, speed data meta analytics 116 and network 118, each of which can be implemented in hardware or a suitable combination of hardware and software. System 100 further includes radar speed systems 104A through 104N and user interface systems 106A through 106N, each of which can be implemented in hardware or a suitable combination of hardware and software.

Master speed data system 102 can be implemented as one or more algorithms operating on a processor that cause the processor when loaded into a working memory to receive speed data from a plurality of radar speed systems 104A though 104N, to process the speed data to provide additional important technical features and to present the data in response to commands from user interface systems 106A through 106N, and to perform other suitable functions. In one example embodiment, master speed data system 102 can be implemented on a distributed cloud computing platform that allows users to enter commands and access the processed data results over network 118 or in other suitable manners.

Vehicle GPS data system 108 can be implemented as one or more algorithms operating on a processor that cause the processor when loaded into a working memory to receive vehicle GPS data or other suitable location data for a patrol vehicle or other device that is generating radar speed data and to process the location data to allow vehicles that are identified in radar speed data to be located. In one example embodiment, one important technical feature of the present disclosure is the processing of radar speed data that does not identify a specific vehicle, as radar speed detectors typically identify and track signals for a vehicle that generates a strongest signal and a vehicle that generates a signal with the fastest speed, and do not identify or track other signals for other vehicles. Vehicle GPS data system 108 generates location data for a vehicle or other system that is used to derive the location of a vehicle associated with radar speed data. In another example embodiment, signal transmission and return time data can be used to differentiate between vehicles on different roadways, such as when a patrol vehicle is travelling on a freeway access road or for other suitable purposes.

Target speed data system 110 can be implemented as one or more algorithms operating on a processor that cause the processor when loaded into a working memory to receive radar speed data and to process the radar speed data to identify vehicles in the speed data. In one example embodiment, one important technical feature of the present disclosure is the processing of radar speed data that does not identify a specific vehicle, as radar speed detectors typically identify and track signals for a vehicle that generates a strongest signal and a vehicle that generates a signal with the fastest speed, and do not identify or track other signals for other vehicles. Target speed data system 110 can use artificial intelligence, deep learning or other suitable processes to process a time sequence of speed data measurements and to eliminate duplicate data sets, such as by tracking changes in speed measurements and eliminating duplicates that resulted from variations in data that fall within a speed measurement tolerance for the associated radar speed detector that generated the speed data. Likewise, targets can increase and decrease in signal strength and speed, such that a target that is being tracked as having a strongest signal or fastest signal can change over time. While the operator of the speed detection radar can use visual data to identify such changes, target speed data system 110 can use artificial intelligence or deep learning to track multiple targets and to avoid misidentification of single targets as duplicate targets using one or more learned vehicle driving behavior rules.

Target status data system 112 can be implemented as one or more algorithms operating on a processor that cause the processor when loaded into a working memory to generate target status data for each detected vehicle. In one example embodiment, one important technical feature of the present disclosure is the ability to generate status data for targets such as "lawful," "speeding," "slow," "stopped" or other suitable data that can be used to map traffic conditions that would otherwise not be tracked by a radar speed detector. Target status data system 112 generates additional data that is not otherwise generated by a radar speed detector, such as by using artificial intelligence or deep learning algorithms that process the radar speed data in addition to training data that can be entered by an operator to properly classify vehicles according to target status. In one example embodiment, target status data system 112 can include a training mode that generates prompts that require an operator to confirm a classification, and that uses operator confirmed classifications to filter new radar speed data by comparing the new radar speed data to a data set of operator-confirmed speed data.

User access system 114 can be implemented as one or more algorithms operating on a processor that cause the processor when loaded into a working memory to generate a user interface with a plurality of controls, to allow a user to access radar speed data that has been processed to generate maps of speed data for suitable purposes. In one example embodiment, user access system 114 can generate controls for a user to identify specific map areas of interest, specific streets of interest, specific times of day of interest, specific target status data of interest or other suitable data that can then be used to generate map data, tabular data or other suitable data.

Speed data meta analytics 116 can be implemented as one or more algorithms operating on a processor that cause the processor when loaded into a working memory to perform meta analytics on the speed data generated by vehicle GPS data system 108, target speed data system 110, target status data system 112 or other suitable systems or processes. In one example embodiment, speed data meta analytics 116 can process GPS data, target speed data, target status data or other suitable data to generate alerts or warnings, such as to direct patrol vehicles to locations having a greater incidence of speeding, to direct parking enforcement to areas with illegally parked vehicles or for other suitable purposes. Speed data meta analytics 116 can generate one or more controls that allow a user to select two or more groups of processed data for further processing, such as to plot a first group of data as a function of a second group of data, to compare speed profiles along a road at different times of day or for other suitable purposes.

Network 118 can be a data network, a wireless communications network, other suitable networks or a suitable combination of networks. In one example embodiment, network 118 can include security protected wireless data access between radar speed systems 104A through 104N, such as a law enforcement wireless data network with a first virtual private network, and a second wireless and wireline data network to user interface systems 106A through 106N, which can include a public Internet in combination with a second virtual private network, device authentication and other security measures.

Radar speed systems 104A through 104N can be implemented in hardware or a suitable combination of hardware and software, and can be configured to transmit radar signals, to process reflected radar signals from a target, to process additional data such as image data or laser data or to perform other speed detection functions. Radar speed systems 104A through 104N can be mounted in patrol vehicles, stationary speed monitoring equipment such as speed warning signs or other locations, and can generate real-time speed data, batch speed data or other suitable speed data as discussed and described herein.

User interface systems 106A through 106N can be implemented as one or more algorithms operating on a processor that cause the processor when loaded into a working memory to generate a user interface at a remote device to allow a user to interact with user access system 114. In one example embodiment, user interface systems 106A through 106N can be implemented on a desktop or laptop processing system, a smart phone or other suitable devices, and can access master speed data system 102 over the Internet, a virtual private network, a wireless network or other suitable media.

In operation, system 100 allows speed data from speed detection devices to be processed to provide additional important technical features that would not otherwise be available. System 100 augments existing functionality and provides additional safety and speed control data that can be used by law enforcement personnel, parking personnel or other suitable individuals.

Figure 2:
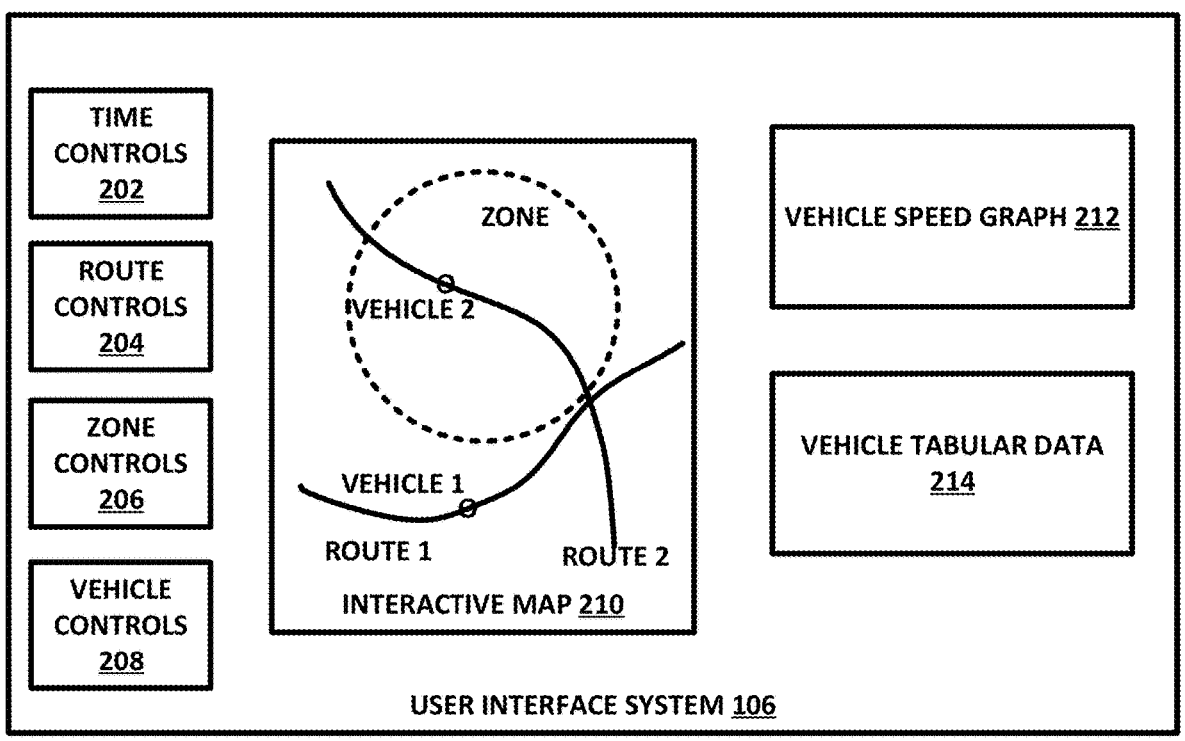
FIG. 2 is a diagram of a user interface for speed enforcement data collection and mapping, in accordance with an example embodiment of the present disclosure.

FIG. 2 is a diagram of a user interface 200 for speed enforcement data collection and mapping, in accordance with an example embodiment of the present disclosure. User interface 200 includes user interface system 106 and time controls 202, route controls 204, zone controls 206, vehicle controls 208, interactive map 210, vehicle speed graph 212 and vehicle tabular data 214, each of which can be implemented in hardware or a suitable combination of hardware and software.

Time controls 202 can be implemented as one or more algorithms operating on a processor that cause the processor when loaded into a working memory to generate one or more user interface controls to allow a user to select a time feature associated with vehicle data. In one example embodiment, a user can select a time window for a route, a time window for a zone, a time window for vehicles, combinations of different time windows for different routes, zones or vehicles, specific times of day or other suitable time controls. Time controls 202 can be received as user interface code from user access system 114 or other suitable systems and can be used to generate user-selectable controls in a display or in other suitable manners.

Route controls 204 can be implemented as one or more algorithms operating on a processor that cause the processor when loaded into a working memory to generate one or more user interface controls to allow a user to select a route feature associated with vehicle data. In one example embodiment, a user can select a street or road way for a route, combinations of different streets and roadways for different routes, sections of streets or roadways for a route, or other suitable time controls. The selected routes can be identified by an automatically generated legend, color codes or using other suitable user interface features. Route controls 204 can be received as user interface code from user access system 114 or other suitable systems and can be used to generate user-selectable controls in a display or in other suitable manners.

Zone controls 206 can be implemented as one or more algorithms operating on a processor that cause the processor when loaded into a working memory to generate one or more user interface controls to allow a user to select a zone feature associated with vehicle data. In one example embodiment, a user can select a predefined zone, can select borders to define a new zone, can select combinations of different zones or other suitable zone controls. Zone controls 206 can be received as user interface code from user access system 114 or other suitable systems and can be used to generate user-selectable controls in a display or in other suitable manners.

Vehicle controls 208 can be implemented as one or more algorithms operating on a processor that cause the processor when loaded into a working memory to generate one or more user interface controls to allow a user to select a vehicle feature associated with vehicle data. In one example embodiment, a user can select a vehicle class such as "speeding" or "parked," combinations of different vehicles for different routes or zones or other suitable time controls. Vehicle controls 208 can be received as user interface code from user access system 114 or other suitable systems and can be used to generate user-selectable controls in a display or in other suitable manners.

Interactive map 210 can be implemented as one or more algorithms operating on a processor that cause the processor when loaded into a working memory to generate a map with interactive features that are user definable and user selectable. In one example embodiment, interactive map 210 can include a zone indicator, vehicle 1 and vehicle 2 indicators, and route 1 and route 2 indicators, such as in response to selections made from time controls 202, route controls 204, zone controls 206, vehicle controls 208, other suitable controls or a suitable combination of controls. In this example embodiment, vehicle 1 and vehicle 2 can represent vehicles have a selected status, such as speeding or parked. Likewise, route 1 and route 2 can be selected in response to a control to generate routes with vehicles having a selected status. In another example embodiment, the zone control can be used to filter vehicles that are parked, and route 1 can be used to filter vehicles that are speeding, such that the user can readily determine that vehicle 2 is parked and vehicle 1 is speeding. These example embodiments are provided to demonstrate the user-selectable combinations that are available through user interface 200 and its associated controls.

Vehicle speed graph 212 can be implemented as one or more algorithms operating on a processor that cause the processor when loaded into a working memory to generate graphical data for a user selected feature of interactive map 210. In one example embodiment, vehicle speed graph 212 can generate a graph showing the number of vehicles along route 1 that were speeding as a function of time, the number of vehicles along route 2 that were parked as a function of time, or other suitable user-selected data in a graphical format.

Vehicle tabular data 214 can be implemented as one or more algorithms operating on a processor that cause the processor when loaded into a working memory to generate tabular data for a user selected feature of interactive map 210. In one example embodiment, vehicle tabular data 214 can generate a table showing the number of vehicles along route 1 that were speeding as a function of time, the number of vehicles along route 2 that were parked as a function of time, or other suitable user-selected data in a tabular format.

In operation, user interface 200 allows a user to interactively select data to be displayed on a map display using one or more controls and to interact with the data. User interface 200 enables a user to generate data displays that are customized for addressing specific traffic conditions as a function of a user-selected route, zone, time or other suitable parameters.

Figure 3:
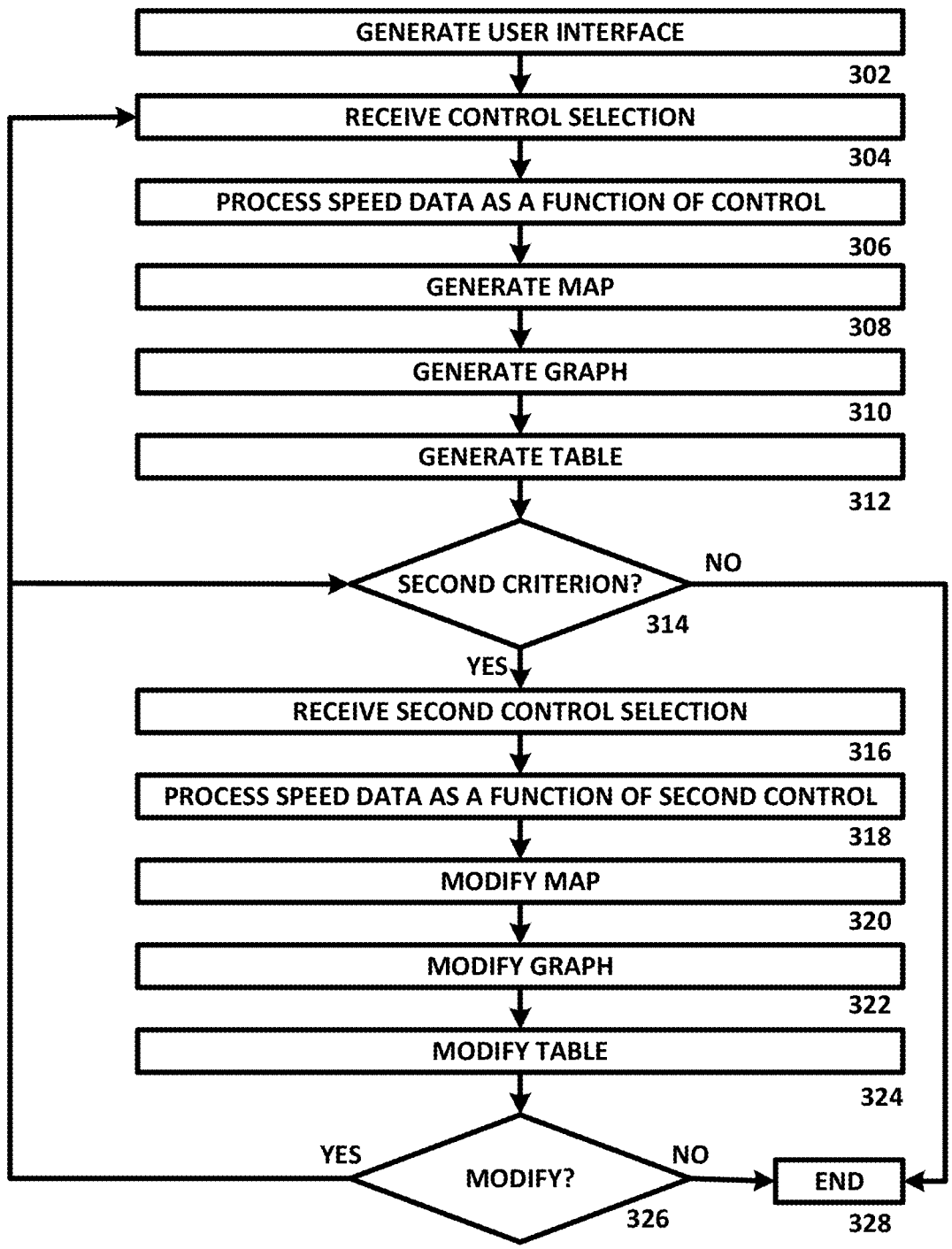
FIG. 3 is a diagram of an algorithm for speed enforcement data collection and mapping, in accordance with an example embodiment of the present disclosure.

FIG. 3 is a diagram of an algorithm 300 for speed enforcement data collection and mapping, in accordance with an example embodiment of the present disclosure. Algorithm 300 can be implemented in hardware or a suitable combination of hardware and software.

Algorithm 300 begins at 302, where a user interface is generated. In one example embodiment, the user interface can be generated at a remote device after the remote device has been authenticated to the system and a thin client or other suitable user interface code has been provided to the remote device, to ensure that the traffic data that is reported and processed by the system is not accessible by adverse parties. The system can be hosted on a cloud computing platform and a virtual private network or other suitable security measures can be used to prevent unauthorized access. The algorithm then proceeds to 304.

At 304, a control selection and control data is received. In one example embodiment, the control selection can be received in response to a control that is generated by the user interface code, where the control allows a user to select a variable or a sequence that is not predetermined to create user-definable data sets. The algorithm then proceeds to 306.

At 306, speed data received from external speed detection devices is processed as a function of the selected control and associated control data. The algorithm then proceeds to 308.

At 308, a map is generated as a function of the processed speed data. In one example embodiment, the map can include data that identifies the selected control (e.g. a time of day, a route) and speed data associated with the selected control (e.g. the points of detected speed along the route), or other suitable data. The algorithm then proceeds to 310.

At 310, a graph is generated. In one example embodiment, the graph can include data that identifies the selected control (e.g. a time of day, a route) and speed data associated with the selected control (e.g. the number of points of detected speed along the route as a function of the detected speed), or other suitable data. The algorithm then proceeds to 312.

At 312, a table is generated. In one example embodiment, the table can include data that identifies the selected control (e.g. a time of day, a route) and speed data associated with the selected control (e.g. the points of detected speed along the route as a function of the detected speed), or other suitable data. The algorithm then proceeds to 314.

At 314, it is determined whether a user control has been received to select a second criterion, a third criterion or other additional criterion. In one example embodiment, a user can select multiple criterion, such as a route, a vehicle classification (e.g. speeding), a time of day and other suitable data, where the user interface and sequence of modification can be selected by the user. For example, the user can request to see all detected speeds along a route for a day, and can then modify the user interface map to see speeding cars, speeding cars at specific times and so forth. In this manner, the user interface can be modified to aid the user with specific tasks or objectives. If it is determined that an additional criterion should be added, the algorithm proceeds to 316, otherwise the algorithm proceeds to 328.

At 316, a second control selection is received. In one example embodiment, the control selection can be received in response to a control that is generated by the user interface code, where the control allows a user to select a variable or a sequence that is not predetermined to create user-definable data sets. The algorithm then proceeds to 318.

At 318, speed data received from external speed detection devices is processed as a function of the second selected control and associated control data. The algorithm then proceeds to 320.

At 320, the map is modified to display the processed speed data. In one example embodiment, the map can include data that identifies the selected control (e.g. a time of day, a route) and speed data associated with the selected control (e.g. the points of detected speed along the route), or other suitable data. The algorithm then proceeds to 322.

At 322, the graph is modified to display the processed speed data. In one example embodiment, the graph can include data that identifies the second selected control (e.g. a time of day, a route) and speed data associated with the selected control (e.g. the number of points of detected speed along the route as a function of the detected speed), or other suitable data. The algorithm then proceeds to 324.

At 324, the table is modified to display the processed speed data. In one example embodiment, the table can include data that identifies the selected control (e.g. a time of day, a route) and speed data associated with the selected control (e.g. the points of detected speed along the route as a function of the detected speed), or other suitable data. The algorithm then proceeds to 326.

At 326, it is determined whether to modify the first control, the second control, to add any additional controls or to perform other user-selected functions. If it is determined that modifications are needed, the algorithm returns to 304 or 314, depending on the selected control. If no modifications are needed, then the proceeds to 328 and ends.

In operation, algorithm 300 allows a user to customize speed enforcement data collection and mapping. Although algorithm 300 is shown as a flow chart, a person of skill in the art will recognize that other suitable programming paradigms can also or alternatively be used to, such as object oriented programming, a state diagram, a ladder diagram and so forth.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for processing vehicle speed data, comprising:
   a plurality of speed data systems operating on one or more electronic devices, each speed data system mounted in a patrol vehicle or a stationary speed monitoring device and configured to detect target vehicle speed data and location data using a system for generating location data and to transmit the target vehicle speed data and location data to a central data processing system; and
   the central data processing system operating on one or more electronic devices and configured to receive the target vehicle speed data and location data, to transmit user interface control data to a remote device that is remote from the central data processing system, and to process the target vehicle speed data as a function of user-entered data responsive to the user interface control data from the remote device to generate a display that incorporates the processed speed data and the location data.

2. The system of claim 1 wherein the location data is a location of a vehicle associated with one of the electronic devices.

3. The system of claim 1 wherein the location data is a location of a vehicle associated with the target vehicle speed data.

4. The system of claim 1 wherein the target vehicle speed data comprises first vehicle speed data of a vehicle containing an associated one of the speed data systems and second vehicle speed data of a monitored vehicle.

5. The system of claim 1 wherein the display further comprises a map that includes a plurality of vehicle speed data readings at a plurality of locations.

6. The system of claim 1 wherein the display further comprises a map that includes a plurality of vehicle speed data readings at a plurality of locations that were reported from a single one of the speed data systems.

7. The system of claim 1 wherein the display further comprises a map that includes a plurality of vehicle speed data readings at a plurality of locations along a route.

8. The system of claim 1 wherein the display further comprises a map that includes a plurality of vehicle speed data readings obtained by a plurality of vehicles containing the speed data systems at a plurality of locations along a route.

9. The system of claim 1 wherein the display further comprises a map that includes a plurality of vehicle speed data readings at a plurality of locations along a route as a function of time of day.

10. A method for processing vehicle speed data, comprising:
    detecting target vehicle speed data and location data at a plurality of speed data systems operating on one or more stationary or mobile electronic devices;
    transmitting the vehicle speed data and location data from the plurality of speed data systems to a central data processing system;
    receiving the target vehicle speed data and location data at a central data processing system;

transmitting user interface control data to a remote device that is remote from the central data processing system;

processing the target vehicle speed data as a function of user-entered data from the remote device responsive to the user interface control data; and generating a display that incorporates the processed speed data and the location data.

11. The method of claim 10 wherein detecting the location data comprises detecting a location of a vehicle associated with one of the electronic devices.

12. The method of claim 10 wherein detecting the location data comprises detecting a location of a vehicle associated with the target vehicle speed data.

13. The method of claim 10 wherein the detecting the target vehicle speed data comprises detecting first vehicle speed data of a vehicle containing an associated one of the speed data systems and detecting second vehicle speed data of a monitored vehicle.

14. The method of claim 10 wherein the generating the display further comprises generating a map that includes a plurality of vehicle speed data readings at a plurality of locations.

15. The method of claim 10 wherein generating the display further comprises generating a map that includes a plurality of vehicle speed data readings at a plurality of locations that were reported from a single one of the speed data systems.

16. The method of claim 10 wherein generating the display further comprises generating a map that includes a plurality of vehicle speed data readings at a plurality of locations along a route.

17. The method of claim 10 wherein generating the display further comprises generating a map that includes a plurality of vehicle speed data readings obtained by a plurality of vehicles containing the speed data systems at a plurality of locations along a route.

18. The method of claim 10 wherein generating the display further comprises generating a map that includes a plurality of vehicle speed data readings at a plurality of locations along a route as a function of time of day.

* * * * *